(12) United States Patent
Lee (10) Patent No.: US 7,369,955 B2
(45) Date of Patent: May 6, 2008

(54) METHOD FOR RESIDENTIAL INDOOR ENVIRONMENTAL QUALITY INSPECTION AND MONITORING

(75) Inventor: Peng Lee, Oxford, MS (US)

(73) Assignee: Homesafe Inspection, Inc., Oxford, MS (US)

( * ) Notice: Subject to any disclaimer, the term of this patent is extended or adjusted under 35 U.S.C. 154(b) by 0 days.

(21) Appl. No.: 11/360,274

(22) Filed: Feb. 23, 2006

(65) Prior Publication Data

US 2007/0198226 A1 Aug. 23, 2007

(51) Int. Cl.
 *G06F 19/00* (2006.01)
(52) U.S. Cl. .......................... 702/81; 236/1 C
(58) Field of Classification Search ................ 702/81, 702/99, 183, 188, 33; 236/1 C, 44 R, 44 A; 374/10, 11, 110; 700/9, 17
See application file for complete search history.

(56) References Cited

U.S. PATENT DOCUMENTS

2006/0173580 A1* 8/2006 Desrochers et al. ........ 700/276

* cited by examiner

*Primary Examiner*—Edward Raymond
(74) *Attorney, Agent, or Firm*—Susan B. Fentress; Baker, Donelson, Bearman, Caldwell & Berkowitz, PC (57) ABSTRACT

Data on indoor air quality can be obtained using air monitoring stations. Air stations can provide information on odor and chemicals, microscopic airborne particulates, carbon monoxide, relative humidity, temperature and carbon dioxide. This data on indoor air quality, however, does not in itself provide a sufficiently comprehensive picture of indoor air quality. The data can be correlated with an infrared home inspection to facilitate the identification of factors affecting indoor environmental quality in a specific residence. Additionally, data on air quality can be obtained using mold air samples. Additional data on indoor environmental quality can be obtained using a sound pressure level meter to measure sound levels (indoor/outdoor) and temperature changes over time. A report on indoor environmental quality can be provided to a homeowner.

22 Claims, 11 Drawing Sheets

METHOD FOR RESIDENTIAL INDOOR ENVIRONMENTAL QUALITY INSPECTION AND MONITORING

FIELD OF INVENTION

This invention relates to the field of residential indoor environmental quality inspection and monitoring.

BACKGROUND OF THE INVENTION

Indoor air quality is one of the five most significant threats to human health. In fact, indoor air quality is potentially more significant then hazardous waste and outdoor air pollution. Systems are available to collect data on indoor air quality (IAQ). Indoor environmental quality data can be obtained on odor and chemicals (such as volatile organic particulates), particulate matter, carbon monoxide and relative humidity.

SUMMARY OF INVENTION

Indoor environmental quality (IEQ) refers to all aspects of indoor settling including air quality, ventilation, thermal comfort and noise. However, to provide a complete IAQ of a residential building a number of monitoring and inspection procedures must be offered for a period of time under set conditions. Additionally, the IEQ data according to the present invention is correlated with an infrared scan of the residential building to identify the factors that are affecting IAQ. For example, an air monitor station might detect high relative humidity; but, this data is of limited value without the identification of the factors that are causing this high relative humidity.

This invention relates to a method to provide a report on indoor environmental quality for a residence. The method can include the steps of recording indoor air quality data and sound pressure data, temperature data for no less than 24 hours. Another step of the method is to create a temperature differential of greater than 10° F. between the interior and the exterior of the residence and then obtain one or more temperature profiles of an interior building component. The indoor air quality data is then compared to a thermal anomaly to identify factors affecting indoor air quality. A comprehensive report on indoor environmental quality of a residence can be prepared under these conditions with the data obtained.

This invention also relates to a method to identify factors affecting indoor air quality of a residential building having an interior and an exterior by creating a temperature differential of greater than 10° F. between the interior and the exterior of the residence. This method includes the steps of: obtaining at least one temperature profile of at least one interior building component, assessing that at least one temperature profile for a thermal anomaly, obtaining data on indoor air quality and comparing the data on indoor air quality with at least one temperature profile for an anomaly indicative of a factor effecting indoor air quality.

BRIEF DESCRIPTION OF DRAWINGS

These drawings accompany the detailed description of the invention and are intended to illustrate further the invention and its advantages.

DETAILED DESCRIPTION OF THE INVENTION

A comprehensive report on indoor environmental quality of a residence can include data on indoor air quality, sound pressure levels, temperature and other factors relating to IAQ. The data on indoor air quality can be correlated with a thermal scan of residential building components to facilitate the identification of factors affecting indoor air environmental quality. This data on indoor air quality, however, does not in itself provide a sufficiently comprehensive picture of indoor environmental quality. The data can be correlated with an infrared home inspection to facilitate the identification of factors affecting indoor environmental quality in a specific residence. Additionally, data can be obtained on the temperature of the residence over time. Similarly, data on indoor environmental quality can be obtained using a sound pressure level meter to measure sound levels (indoor/outdoor).

Figure 9:
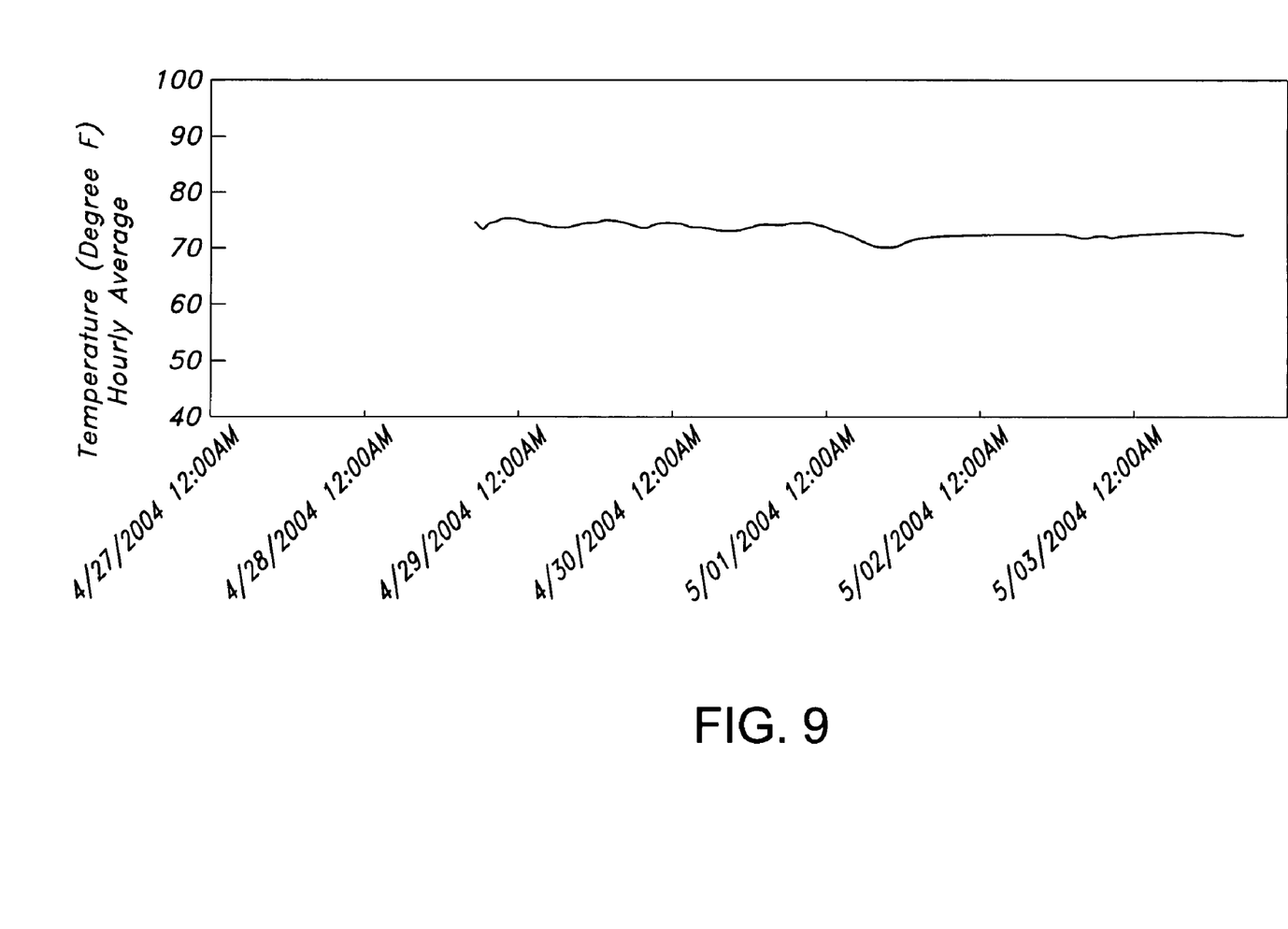
FIG. 9 is a graph of temperature versus time.

More specifically, data on indoor air quality can be obtained using air monitoring stations. Air stations can provide information on odor and chemicals, microscopic airborne particulates, carbon monoxide, relative humidity, temperature and carbon dioxide. If particulate data is high, the thermal scan can be used to pin point the cause. For example, random particulate pattern as shown in FIG. 9, is evidence that dust is being disturbed. If the homeowner; however, is away, the explanation for random high particulate can be a pet. If the homeowner does not own a pet the explanation can be rodent infestation. A thermal scan of building components can be used to detect rodent infestation. Additionally, high relative humidity greater than 70% in the summer and greater than 40% in the winter can be correlated with a range of moisture problems using a thermal scan. These moisture problems include a termite infestation, water in heating and cooling ducts, and internal plumbing leaks.

Infrared Scanning Methods and Apparatus—Infrared scanning works because different parts of a building's components retain different temperatures due to the individual component type's thermal properties, such as heat capacity, heat transmission, heat retention and heat dissipation. The difference between indoor and outdoor temperatures creates a temperature gradient, causing the heat to transmit from high temperature areas to low temperature areas. Due to the different thermal properties of different residential building components, heat transmits and dissipates through these different residential building components at different rates.

Take a building's wall in the summertime, for example: When scanning the interior wall with an infrared camera, fiber grain insulation transmits much less heat than a 2×4 stud; the 2×4 stud thus has a higher temperature which can be easily registered by the infrared sensor (camera). Infrared detection also has the advantage of covering a larger area very quickly and provides the inspector with critical information about potential problem areas in order to guide the inspector to carry out more specific tests and inspections.

Because different seasons of the year generate different weather conditions, a building experiences large fluctuations of temperature, humidity and atmospheric pressure changes. At certain times of the year, such as spring and fall, the outdoor temperature can be very close or equal to the indoor temperature. This reduction of the difference between indoor and outdoor temperatures greatly reduces the thermal imaging (infrared) device's ability to "see" inside the building's components.

The preferred procedure of the invention creates a larger temperature contrast between the building's components, thus greatly increasing the effectiveness of the thermal imaging system. The bigger the temperature contrasts between the building's components, the better the temperature profiles will be. The procedure involves activating the building's own heating or cooling system for a certain period of time prior to the inspection. The duration can be as brief as one minute to as lengthy as a few hours, depending on the size (capacity) of the heating/cooling system and the size and condition of the building. At a certain point of the heating or cooling process, the temperature contrast reaches a workable condition for the thermal imaging sensor. Therefore, the inspector will have to periodically check the conditions with the thermal camera. The decision to activate either the heating or cooling mode of the building's heating/cooling system will depend on the outdoor temperature. A preferred rule of thumb is to let the inspector make this judgment: If he feels it's cold outside (below 70° F.), he will activate the heating system. In the event that the building is not equipped with a heating or cooling system, an external heating or cooling unit can be employed to achieve a similar effect. In this method, a temperature differential of greater than 10° F. between the inside and the outside of the building is created. This can be achieved by running either the heating or air conditioning system until the desired temperature differential is obtained.

Figure 1:
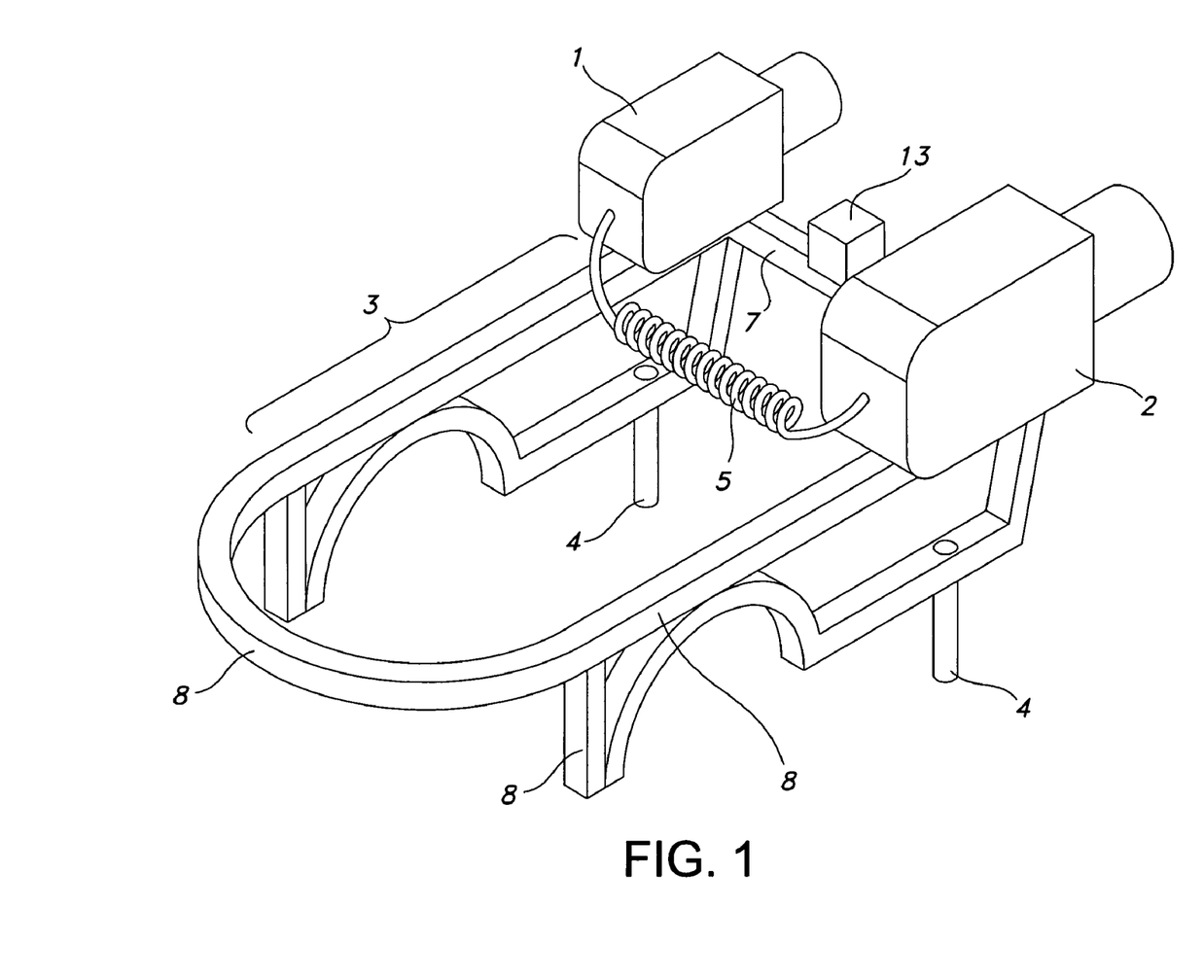
FIG. 1 is a schematic illustration of a nondestructive thermal imaging apparatus in accordance with the principles of a preferred embodiment of the invention.

As schematically illustrated in FIG. 1, the preferred embodiment of the invention includes a thermal imaging (infrared) camera 1 for performing a scan of residential building components in order to locate potential problems in the building. An infrared camera is an apparatus that converts the spatial variations in infrared radiance from a surface into a two-dimensional image, in which variations in radiance are displayed as a range of colors or tones. In this application, it is preferred that the image is displayed as tones, with dark shades representing cold and light shades representing hot infrared radiance. This is commonly called the gray scale. Gray scale work is best for home inspection because it is less confusing; however, color is also sufficient for home inspection.

The temperature profiles created by the thermal imaging camera can be assessed to detect a thermal anomaly indicative of a problem with the residential building components. In the preferred embodiment, each of the temperature profiles is assessed for an anomaly; however, in certain situations where time is limited or a specific problem is being addressed, at least one of the thermal anomalies are assessed for a problem.

A problem in a residential building component will appear as an anomaly in a temperature profile. An anomaly is any deviation from the normal characteristics of a specific type of residential building component. A temperature profile anomaly is indicative of a possible problem with the residential building component. These building problems include but are not limited to the following: structure, insulation, moisture, electrical hot spots, water leakage, unwanted pests such as termite, mice, and rats, and air duct leakage. The term residential building components include elements of a building, such as walls, ceilings, windows, plumbing fixtures, etc. The residential building component can be an exterior component, such as exterior wall (wood, bricks, stucco, EIFS or vinyl siding), eaves, fascias and interior surface of a pitched roof. Similarly, the residential building component can be the electrical system. Additionally, the residential building component can be an interior structure, such as insulation, wiring, air duct, and finished surfaces. For example, a low temperature measured for a residence can be compared to a temperature profile of insulation to discover that the insulation has been disturbed by a mouse infestation.

Pests such as termites and even mouse and rat infestations have been recorded because of the telltale thermal discrepancies their respective environments provide. In the case of native termite species, these destructive pests require moisture in order to survive at high humidity levels. The thermal imaging system provides an additional tool for discovering the presence of termites and increases the detection of an active colony from about 30% (traditional inspection method) to at least 60%. This means that while the sensor system cannot detect 100% of all termite infestations, it can measurably double the chances of finding active colonies that have not been discovered through traditional inspection. The protocol for an acoustic detection is set out in U.S. Ser. No. 10/680,377 filed Oct. 7, 2003 (hereby specifically incorporated by reference). Most termite infestations in residential building are caused by subterranean termite. Subterranean termite required high level of moisture content (high humidity) in their infested area. Extended periods of high humidity can facilitate the growth of molds, mildews, fungi, bacteria, viruses and dust mites. These contaminates and substances they produce can cause eye, nose and throat irritation, shortness of breath, dizziness, lethargy, fever, digestive problems, asthma, or influenza and other infectious diseases. Therefore, it's important to locate, stop and remove these hidden subterranean termite infestation as quickly as possible. The method for inspection of interior residential components for subterranean termite infestation with the combination of traditional visual termite inspection, infrared scan and acoustic detection (U.S. Ser. No. 10/680,377, filed April 15, hereby specifically incorporated by reference) can be applied to locate source of moisture quickly and accurately.

As for small animals, such as mice, rats, squirrels, and etc. when they infest a house attic or wall space, they tend to burrow through insulation, creating air gaps in the normally evenly distributed insulation and thereby changing the thermal properties of the insulation, leaving visual evidence of tunnels and nests that would normally be invisible to even the trained eye. This can result in thermal discomfort which is part of the indoor environmental quality issue.

Mice droppings can carry bacteria van viruses and their dried urine introduce airborne allergens. These contaminates and substances they produce can cause eye, nose, and throat irritation, shortness of breath, dizziness, lethargy, fever, digestive problems, asthma, or influenza and other infectious diseases. Therefore, it is important to locate, stop and remove these hidden mice infestation as quickly as possible. The method for inspection of interior residential components for hidden mice infestation with the combination of traditional visual inspection and infrared scan (U.S. Ser. No. 10/708,571, filed Apr. 15, 2004, hereby specifically incorporated by reference) can be applied to locate the source of hidden mice infestation quickly and accurately.

The corresponding video images of the potential building problems are recorded by digital recording device 2. A digital recording device 2 is a means to record a digital image. The thermal imaging camera 1 is connected to digital recording device 2 by cable 5. the video output of the infrared camera 1 is input to the video recording device 2. Thermal imaging camera 1 may be any of a number of commercially available infrared cameras conventionally used by structural engineers, police and the military. In order to improve the accuracy by which thermal imaging camera 1 detects potential problems, the thermal imaging camera 1 may further include target recognition software, such as matched filtering software which compares the frequency spectra of reference images, thereby reducing the level of skill required of the camera operator.

Figure 3:
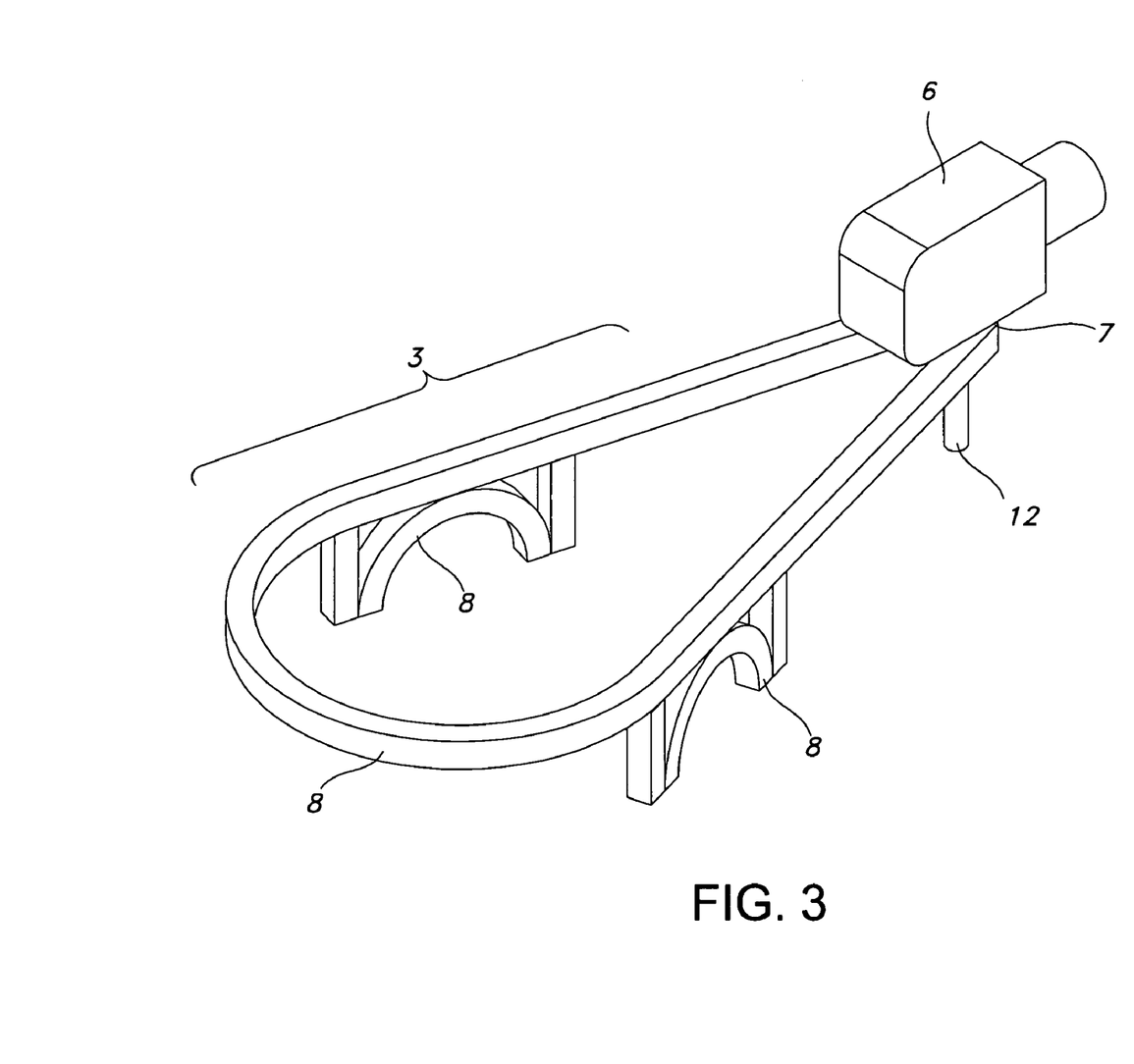
FIG. 3 is a schematic illustration of an alternate embodiment of the apparatus.

While the invention is not limited to a particular thermal imaging (infrared) camera 1, there are various thermal imaging systems that are sensitive enough and capable of evaluating residential building components. For example, Raytheon's Control IR2000B or 300D thermal imaging system, although not the most sensitive, has shown good consistency and accuracy. It is robust and, most importantly, relatively inexpensive. Those skilled in the art will appreciate that it is also possible to use other types of thermal imaging cameras 1 so long as they are sufficiently sensitive to detect temperature variations normally down to 0.12 degrees Celsius or lower (e.g., 0.08 degrees Celsius) and cover an approximate frequency range of the infrared spectrum emitted by residential building components. The infrared detector resolution is preferably 240×320 or higher; but can be 120×160 (with a good thermal window). It will, of course, be appreciated by those skilled in home inspection that the thermal imaging camera 1 and the digital recording device 2 may be combined into a combination unit 6 as shown in FIG. 3. However, a combination unit 6 presently carries a much higher price tag, which makes the residential application much less attractive.

Figure 2:
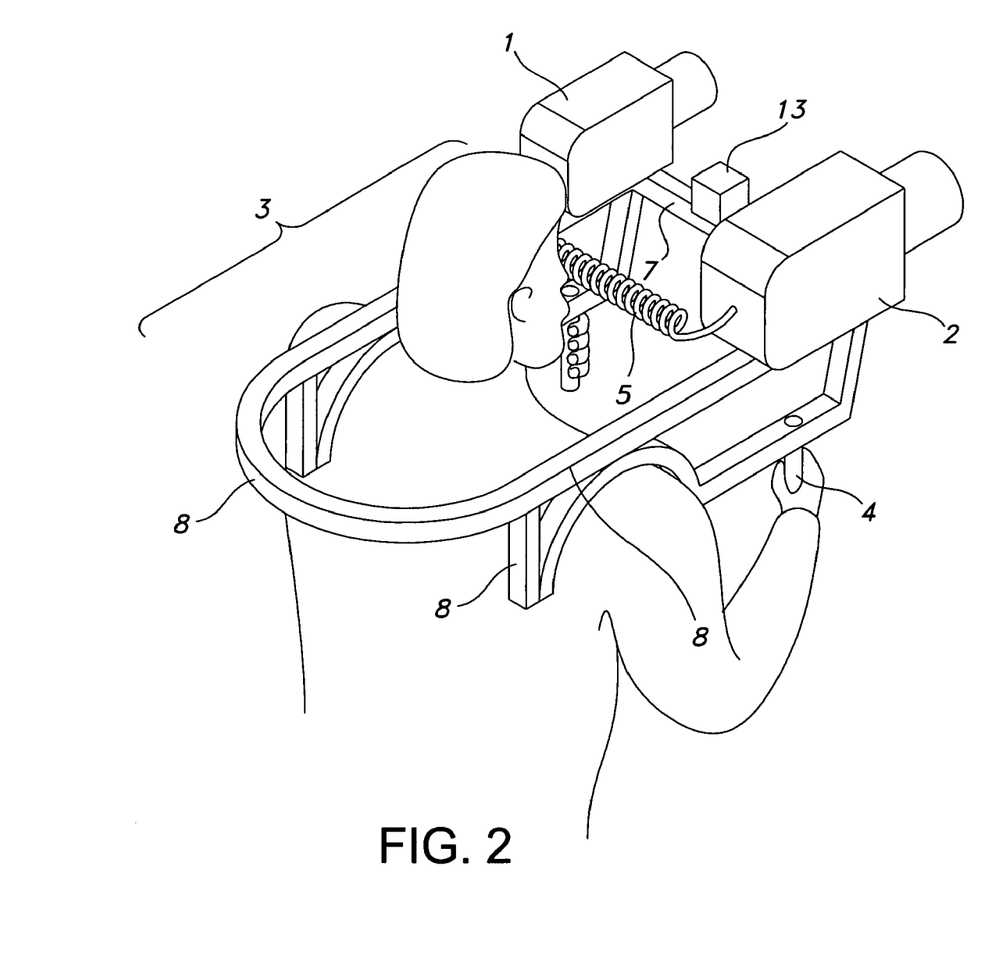
FIG. 2 is a schematic illustration of a nondestructive thermal imaging apparatus in accordance with the principles of a preferred embodiment of the invention.

While one particularly preferred embodiment is the new arrangement specifically designed to securely position the device in front of the inspector for ease of operation, out of harm's way to protect the sensitive infrared camera, and to allow the inspector to have both hands free when needed to move an object. As shown in FIG. 1, a harness apparatus 3 allows both the thermal imaging camera 1 and the digital recording device 2 to be mounted in a balanced, safe and easy-to-use position for the inspector. As shown in FIG. 2, the harness apparatus 3 is designed to be securely mounted over the inspector's shoulders. The harness apparatus 3 allows the operator to operate with his hands with the aid of the handles 4 or without hands in the event that the hands need to be free to perform other functions, with add chest support (not shown). The harness apparatus 3 is configured to support at least one residential inspection device. The residential inspection device can include, for example, a thermal imaging camera, video recording device, a means to transmit or record a digital recording image, such as a LCD or a digital camera, a combination unit thermal imaging camera recording and a wireless communication apparatus.

More specifically, the harness apparatus 3 in the preferred embodiment has a first portion 7 for supporting at least part of a thermal imaging camera 1 and if desired at least part of the digital recording device 2 such as a digital recording camera. In this embodiment, the thermal imaging camera 1 and the digital recording device 2 are attached to the first portion 7 of the harness 3. This first portion 7 is connected to a second portion 8. The first and second portions form an enclosure. The enclosure is of sufficient size to accommodate a human torso as shown in FIG. 2. The thermal imaging camera 1 in this embodiment is operably connected via a cable 5 to a digital recording device 2.

The second portion 8 is generally "U" shaped with the leg portions of the "U" being sufficiently spaced apart to accommodate a human torso. The second portion 8 can function to support at least part of the thermal imaging camera 1 and at least part of the digital recording device 2. The second portion 8 is configured to receive the shoulder portions of a human. The term configured to receive the shoulder portion of the human torso means that the second portion 8 rests on the shoulder so that the harness 3 is above the shoulders. In one embodiment, the residential inspection devices are attached to the second portion. The first portion 7 and second portion 8 are configured to support at least one residential inspection device in that they provide a flat, rigid platform for the residential inspection devices. The second portion 8 can include a plurality of handles 4 which project generally downwardly. The plurality of handles 4 may be of any shape to be gripped by the hand of the person wearing the harness apparatus 3. The second portion 8 can be formed of two parts to make a more rectangular enclosure (not shown).

In the alternate embodiment shown in FIG. 3, the harness apparatus 3 is a generally triangular shaped substantially one piece unit. In this embodiment, a combination unit thermal imaging camera recording device 6 is affixed to the first portion 7 of the harness apparatus 3. The harness apparatus 3 includes a second portion 8 adopted to retain the shoulder portion of a human torso. A single handle 12 can be made one piece with the unit or attached to the harness apparatus 3.

The embodiment shown in FIGS. 1 and 2 can include a means to transmit a digital image to a central receiving facility. This communication apparatus 13 can be affixed to harness apparatus 3. Various wireless communication apparatus are known to those skilled in the art, such as a wireless internet communication system.

The interior building components of a residence can be thermally scanned. The interior building component includes: wall insulation, plumbing, structural members and air ducts. The inspector should turn on the heating/air conditioning by setting the interior thermostat(s) to 10° F. above or below the ambient exterior temperature shortly after arrival on site. When outdoor temperature is above 70° F., turn on the air conditioner to 10° F. lower. When outdoor temperature is less than 70° F., turn on the heat to 10° F. higher. This provides two of the three major requirements to obtain a suitable thermal gradient within a house: 1) increasing temperature differential between finished surfaces and interior ambient air temperature, and 2) interior air movement throughout the living spaces of the home. The temperature differential provides the gradient. The moving air enhances the gradient and sharpens the contrast between hidden moisture within structures and substrates and other areas within the structures or substrate, permitting the thermal camera to visually illustrate those thermal differences.

Figure 4A:
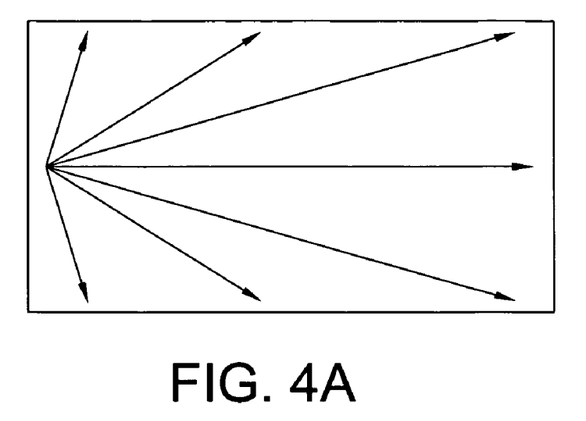
FIGS. 4A, B and C are schematic diagrams of methods to use the camera.
Figure 4B:
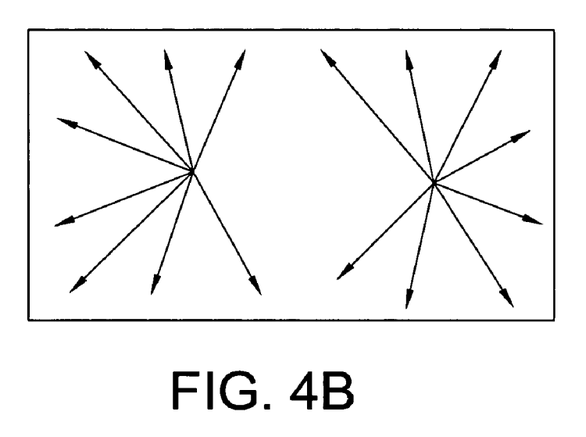
Figure 4C:
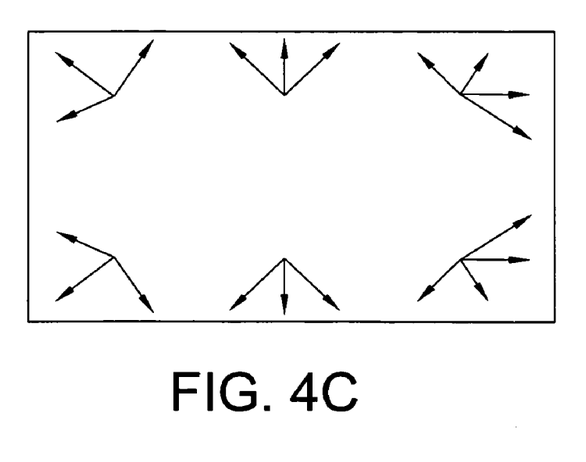

Referring to FIGS. 4A, 4B and 4C, a method to scan an interior residential building component is disclosed. In the first step of this scanning method, an operator using the thermal imaging camera 1, digital recording device 2 and harness apparatus 3 shown in FIG.1 scans from afar as shown in FIG. 4A. Next, the operator scans from mid-range pointing the imaging camera 1 from two equidistant points in a room as shown in FIG. 4B. In the next step, as shown in FIG. 4C, a scan from close range is accomplished by scanning a plurality of points within a smaller arc. Different inspectors may have a different way of scanning the interior of the building; however, any method adopted should be systematic to insure completeness. The combination of the use of the harness apparatus 3, the use of a systematic method to scan and the use of the methods to improve image contrast result in a rapid method to nondestructively inspect a residence.

Another feature of this invention involves an indoor air quality measuring station, such as Air Advice, Inc. This device, or a similar one, is placed in the house for at least 24 hours. The indoor air quality measuring station can include data on: odors and chemicals, microscopic airborne particulates, volatile organic compound (VOC's), gases, relative humidity, temperature and radon gases. Additionally, air, swab and mold samples can be taken and sent to an EPA approved laboratory for identification.

Volatile Organic Compounds (VOC's) Odors and Chemicals can come from a variety of sources in the home, including paint; aerosol sprays; solvents; harsh cleaning products; pressed wood products; tobacco smoke; fuel burning appliances; hobby supplies; carpet and carpet padding; and glues. General health effects include: eye, nose and throat irritation; allergic reactions, including skin rash; fatigue; wheezing and coughing; headache, nausea and loss of coordination; central nervous system, liver and kidney damage. Some organic compounds are suspected or known to cause cancer in animals and humans. Example. An air advice Monitor reports a combined total value for a variety of compounds of general concern in homes. Results from this device are intended to be used as a screening tool to determine the overall level of severity. Since the AirAdvice System™ is placed in a residential building for at least 24 hours. By reviewing the time and day on each chart, one skilled in the art will be able to see how these factors correspond to activities inside and outside your home. Homeowner can then be advised to increase outdoor air ventilation or reduce the use of low VOC's emission product or both.

Carbon Dioxide ($CO_2$) is a gas naturally found in outdoor air at concentration of approximately 350 PPM, Indoor $CO_2$ levels are generally higher than outdoor level as a result of building occupant respiration. Carbon dioxide levels reported by AirAdvice serve as an indicator for the amount of fresh-air ventilation being supplied to the location under test. Adequate fresh air ventilation maintains low $CO_2$ levels, dilutes contaminates such as particulates, odors and other gasses (VOC's) and contributes to a comfortable environment. High $CO_2$ level reduce productivity level as well as reduced quality of life. Since the AirAdvice System™ is placed in a residential building for at least 24 hours. By reviewing the time and day on each chart, one skilled in the art will be able to see how these factors correspond to activities inside and outside your home. This provides a better picture of the $CO_2$ level in the house, it allows inspector to trace back to the source.

Relative Humidity (RH). The AirAdvice System™ uses relative humidity as an indicator for the level of moisture in the air. RH is directly related to temperature—warm air can hold more moisture than cool air. This is why condensation can form on cool surfaces such as the exterior walls of a room and on windows. Relative humidity is important because over extended periods of high indoor RH can facilitate the growth of molds, mildews, fungi, bacterial, viruses and dust mites. These contaminates and substances they produce can cause eye, nose and throat irritation, shortness of breath, dizziness, lethargy, fever, digestive problems, asthma, or influenza and other infectious diseases. Extended periods of low RH can also affect the human body. Breathing dry air depletes body fluids which can worsen problems associated with asthma, bronchitis, sinusitis, nosebleeds and general dehydration. Low humidity can irritate and dry the skin and eyes. Extended periods of low RH can deteriorate wood and other objects in the home and increase static electricity. Low RH also makes air feel cooler, so a higher thermostat setting is required to achieve the same level of warmth, thus increasing the cost of home heating bills. Common sources of excess humidity are water leaks (roof leaks, pipe leaks, condensation), subterranean termite infestation, poor insulation, people, household pets, poorly maintained humidifiers air conditioners, showers, baths, outside air infiltration, insufficient ventilation, indoor-vented clothes dryers and cooking ranges. Venting humid air into the living space or attic can cause moisture buildup. Typical signs of excess humidity are wet or moist walls, ceilings, windows and furniture.

Properly install insulation and vapor barriers. Install and use kitchen and bathroom fans and vent them directly to the outdoors. Vent clothes dryers to the outdoors. Install and maintain air conditioners, dehumidifiers following manufacturer recommendations. Clean and dry or remove water-damaged carpets as soon as possible. Increase fresh air ventilation and heat hour home to proper levels. Building materials that remain wet for between 24 to 48 hours have the potential for mold developing and developing quickly. Molds thrive on organic material. One organic material of particular importance is cellulose. Cellulose makes up residential components such as ceiling tile, dry wall, insulation, books carpeting, upholstered furniture, curtains, food and etc. The most important thing is to find the source of causing the mold to grow, which is the moisture. A good mold investigator focuses on locating moisture not microbiology or sampling. Condensation, construction techniques, and water intrusion lie at the heart of a proper mold investigation. Mold issues begin and end with moisture issues— Caoimhin P. Connell (Senior Industrial Hygienist for Colorado industrial hygiene and toxicological consulting firm). The method for inspection of interior residential components with the combination of traditional visual home inspection and infrared scan (U.S. Ser. No. 10/708,571, filed Apr. 15, 2004) hereby specifically incorporated by reference in its entirety)) can be applied to quickly and accurately to locate the source of moisture.

Carbon Monoxide (CO) is a colorless, odorless gas that can pose a significant health risk. CO is a byproduct of burning fuels such as gasoline, wood, oil, kerosene and charcoal. Inhaled CO enters the blood stream, decreasing the blood's ability to carry oxygen to the body's organs and tissues. Exposure to high CO levels can result in death. Exposure to moderate CO levels can cause severe headaches, dizziness, reduced mental function, nausea, or fainting; and exposure to low CO levels can cause shortness of breath, mild nausea, or mild headaches. Some of these symptoms may be misdiagnosed as flu, food poisoning, or other illnesses. Because CO is colorless and odorless, a CO alarm provides immediate warning of very high CO levels and should be considered essential. Moderate CO levels in a home are also dangerous, but will not trigger most CO alarms. The source of these elevated levels should be identified and corrected as soon as possible. You can take action to reduce CO levels and keep them below an unhealthy level. It is important to follow all manufacturer ventilation and maintenance guidelines for any heating, cooking, or fuel burning appliance used in the home. Elevated CO level is often due to improper used of heating, cooking, fuel burning appliance in and near the house.

The carbon monoxide (CO) sensor in the AirAdvice monitor reports low-to-moderate levels of CO (5-30 ppm). These are below the levels where a CO alarm would alert users. Carbon monoxide levels above 30 ppm will be displayed as 30 ppm by the AirAdvice report and may mean that your home experienced levels higher than indicated during the period. Since the AirAdvice System™ is placed in a residential building for at least 24 hours. By reviewing the time and day on each chart, one skilled in the art will be able to see how these factors correspond to activities inside and outside your home. This provide a better picture of the CO level in the house, it allows inspector to trace back to the problem spot.

Particulate Matter (PM) is microscopic material that can become suspended in air. It is a complex and changing mix of very fine solids and even liquid that can be inhaled through the sinuses and deep into the lungs. This mix can include allergens such as dust; plant and insect fragments (especially from dust mites and cockroaches); fungi; pollen; and human and animal dander (skin flakes). It can also include viruses, bacteria and potentially toxic substances from sources such as car exhaust and other Fumes. These substances can not only trigger and make worse symptoms of both allergies and asthma; they can also potentially worsen the general health of those exposed. This is an especially important consideration for sensitive populations such as the elderly, people with circulatory, respiratory or other health concerns, pregnant women, and children. Indoor particulate levels can be elevated as a result of pets, cigarette smoke, dust from carpeting and furniture, cooking and outdoor pollution. PM levels are heavily influenced by cleaning practices and activity level in the home.

PM can be reduced by: Vacuuming frequently with a good vacuum cleaner; dust with a damp rag; remove shoes at the door to avoid tracking in dirt and harmful substances; avoid smoking indoors; wash bedding weekly using hot water; dry clothing and bedding using high-heat to help remove allergens; and properly install and maintain heating, ventilation and air conditioning (HVAC) systems. Since the AirAdvice System™ is placed in a residential building for at least 24 hours. By reviewing the time and day on each chart, one skilled in the art will be able to see how these factors correspond to activities inside and outside your home. This provide a better picture of the PM level in the house, it help inspector to trace back to the source.

Noise. Community noise (also called environmental noise, residential noise or domestic noise) is defined as noise emitted from all sources except noise at the industrial workplace. Main sources of community noise include road, rail and air traffic; industries; construction and public work; and the neighborhood. The main indoor noise sources are ventilation systems, Heating and cooling system (HVAC), office machines, home appliances and neighbors. The growth in noise pollution is unsustainable because it involves direct, as well as cumulative, adverse health effects. It also adversely affects future generations, and has socio-cultural, esthetic and economic effects.

Physically, there is no distinction between sound and noise. Sound is a sensory perception and the complex pattern of sound waves is labeled noise, music, speech etc. Noise is thus defined as unwanted sound. Most noises can be approximately described by several simple measures. All measures consider the frequency content of the sounds, the overall sound pressure levels and the variation of these levels with time. Sound pressure is a basic measure of the vibrations of air that make up sound and can be measured by a sound pressure level meter. Different type of noise require different treatment, it depend on the loudness, frequency content and number of noise sources. One good example is the noise produce by the blower fan of the heating and cooling system (HVAC). This annoying noise is a result of cost cutting construction practice. Builder too often placed the HVAC heat exchanger (Coil) in the center of the house (middle of hall way), typically in a closet with the air filter locate at the lower section of the wall. The blower fan is located at the lowest section of the heat exchanger, which is just above the air filter. This arrangement provides a short and easy path for the blower fan noise to enter the living space. This type of noise can be control by using acoustic attenuator U.S. Pat. No. 6,668,970 (issued Dec. 30, 2003).

The health significance of noise pollution: noise-induced hearing impairment; interference with speech communication; disturbance of rest and sleep; psychophysiological, mental-health and performance effects; effects on residential behaviour and annoyance; and interference with intended activities. According to World Health Organization: For a good night's sleep, the equivalent sound level should not exceed 30 dB(A) for continuous background noise, and individual noise events exceeding 45 dB(A) should be avoided. As for daytime indoor noise should be lower than or equal to 45 dB(A). Many city and municipality has adopted similar guideline.

EXAMPLE 1.

Figure 5:
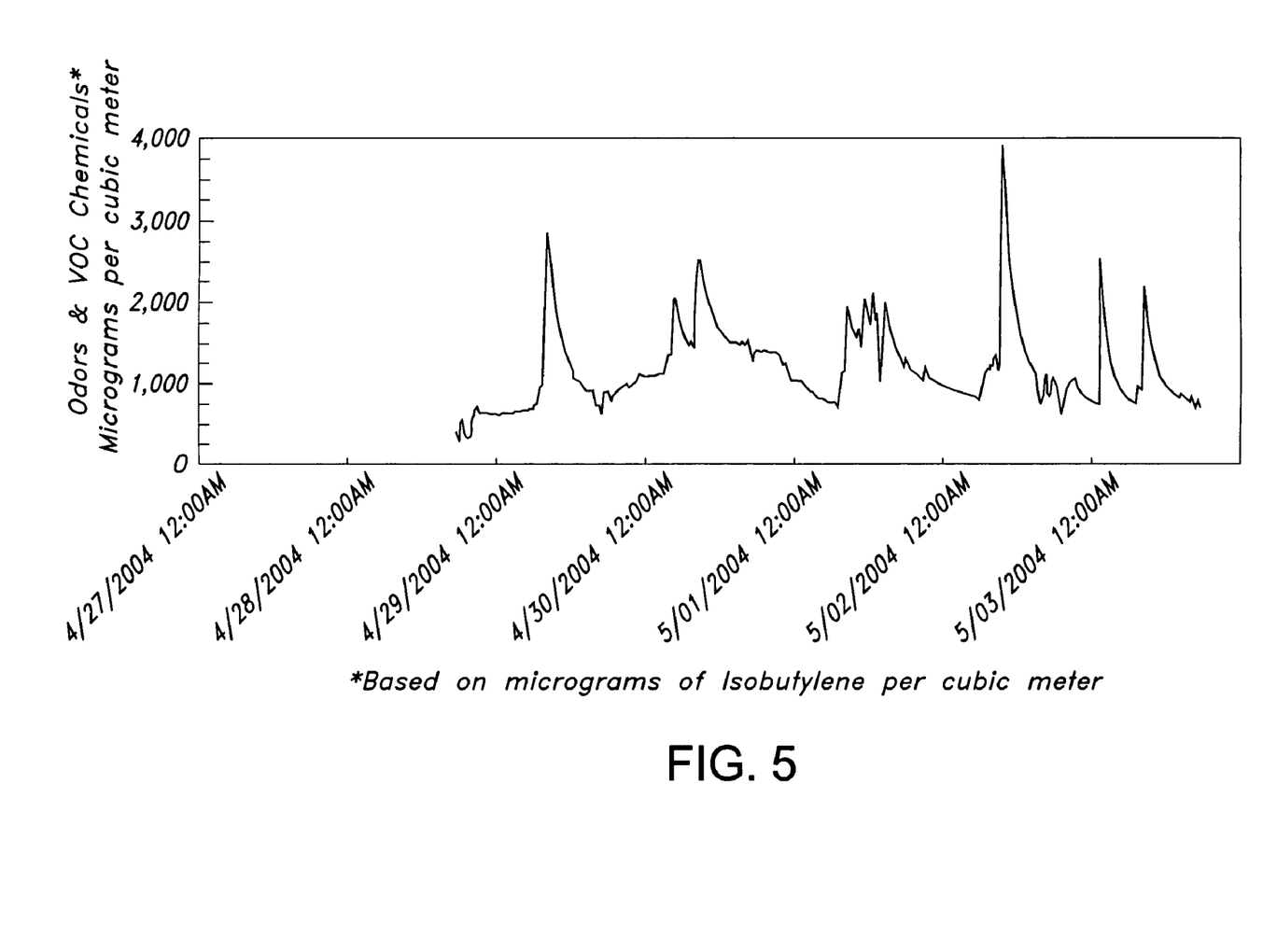
FIG. 5 is a graph of odors and chemicals versus time.
Figure 6:
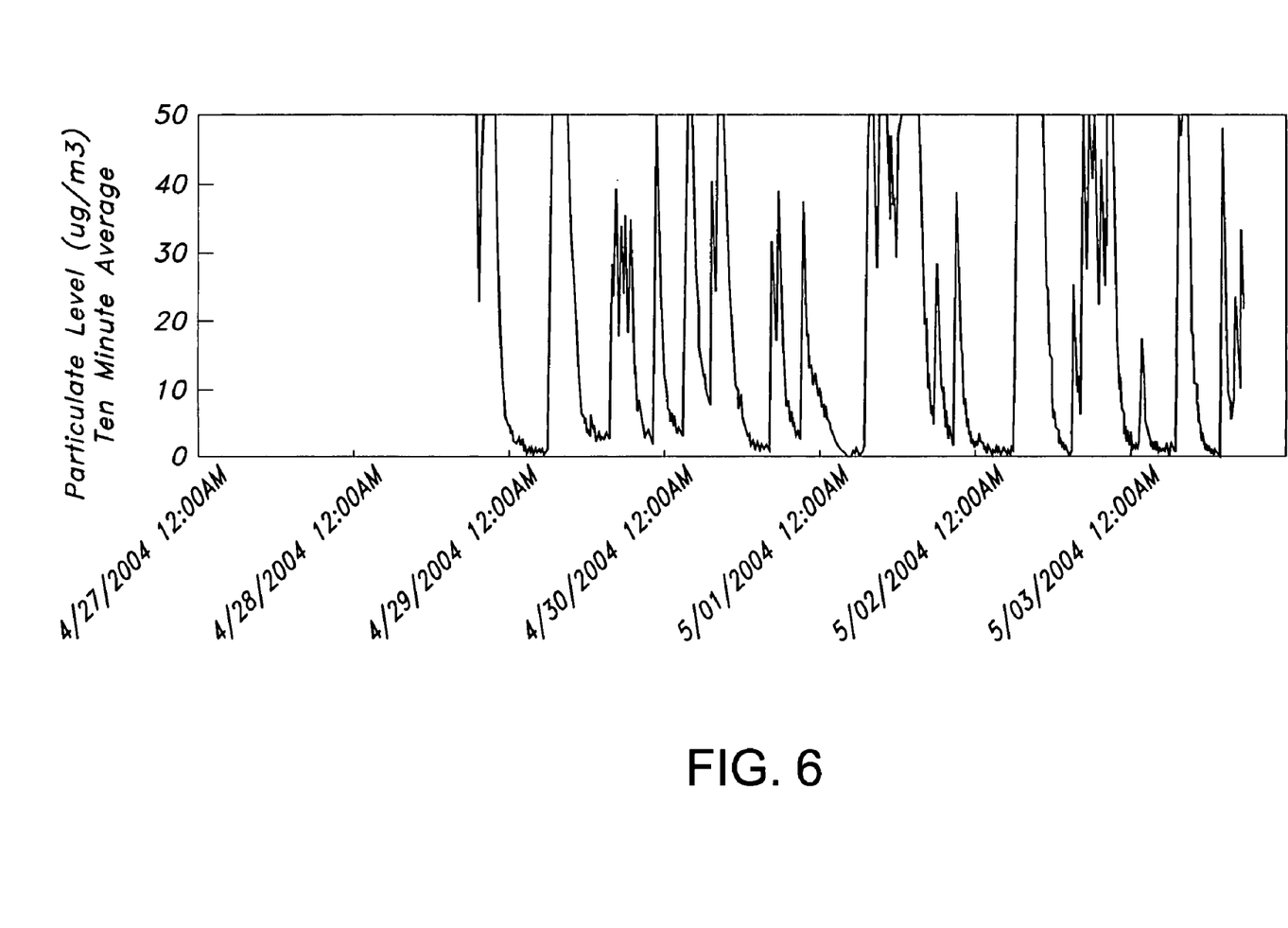
FIG. 6 is a graph of a particulate level ($\mu g/m^3$) versus time.
Figure 7:
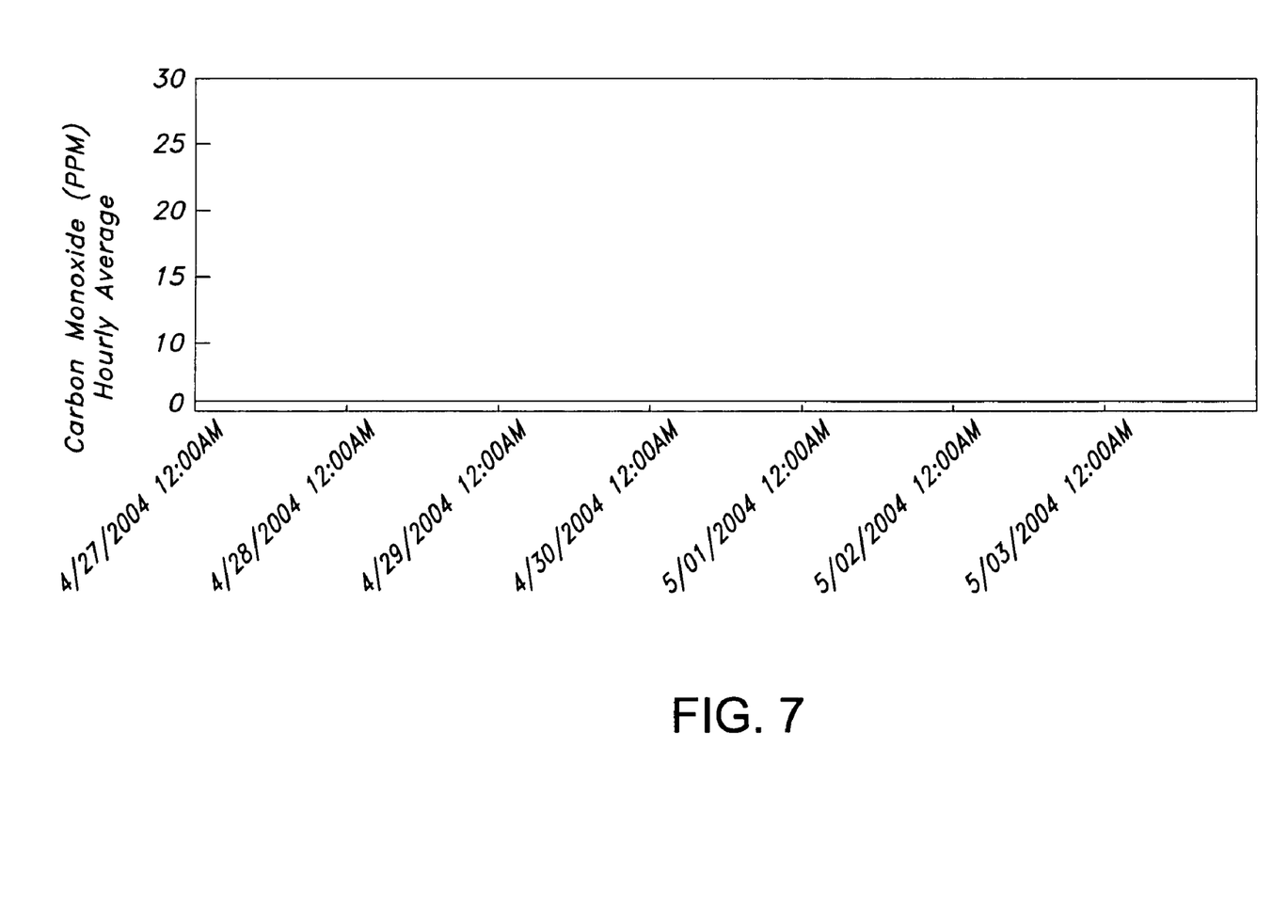
FIG. 7 is a graph of carbon monoxide (ppm) versus time.
Figure 8:
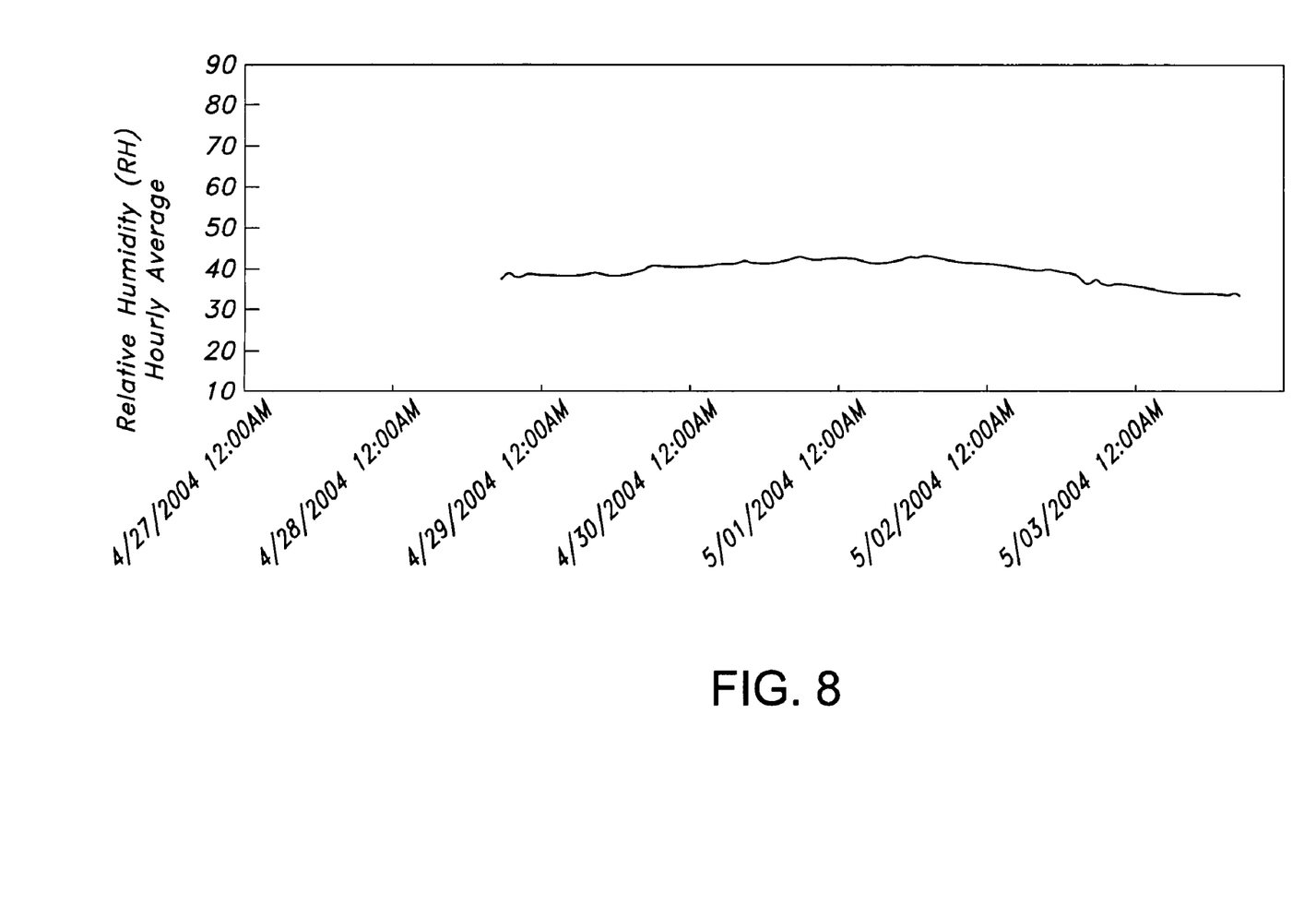
FIG. 8 is a graph of relative humidity versus time.

Now referring to FIG. 5, an Air Advice monitor (Serial No. 13416) is placed in a residential home for four (4) days. During monitoring, microscopic airborne particles and total volatile organic compound (VOC's) were significantly elevated during the test period. Now referring to FIG. 6, the air monitor showed elevated microscopic airborne particulates. Now referring to FIG. 7, carbon monoxide levels did not exceed recommended ranges, during the testing period. Now referring to FIG. 8, the relative humidity levels are within recommended range. Now referring to FIG. 9, the temperature levels are within normal range. A temperature differential of greater than 10° F. between the interior and exterior was obtained. A thermal scan of the residential building components showed no structural features that can be correlated with the air quality data. A report can be provided to the homeowner showing indoor air quality data, sound and temperature changes over a period of time.

EXAMPLE 2.

Figure 10:
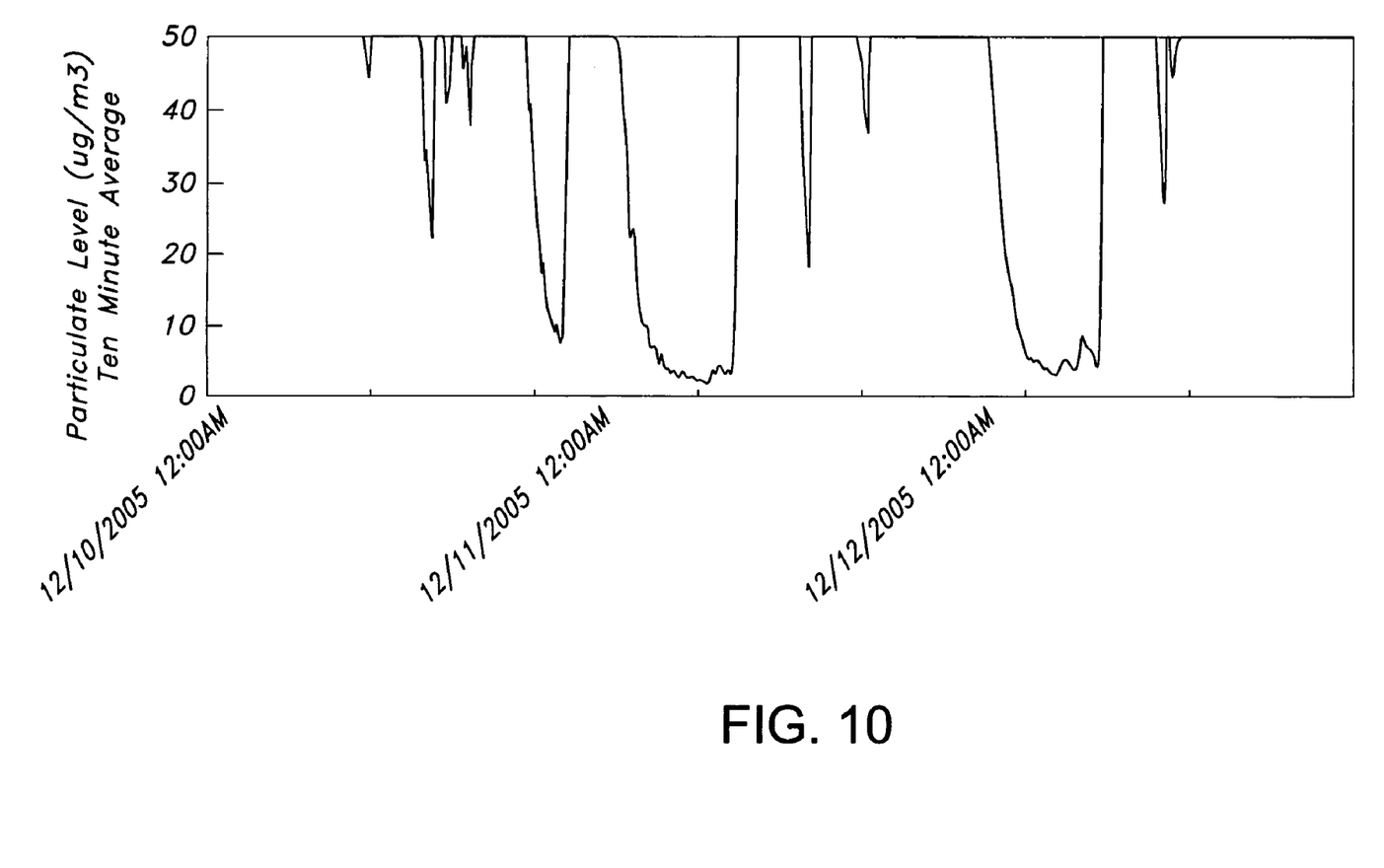
FIG. 10 is a graph of particulate level versus time.
Figure 11:
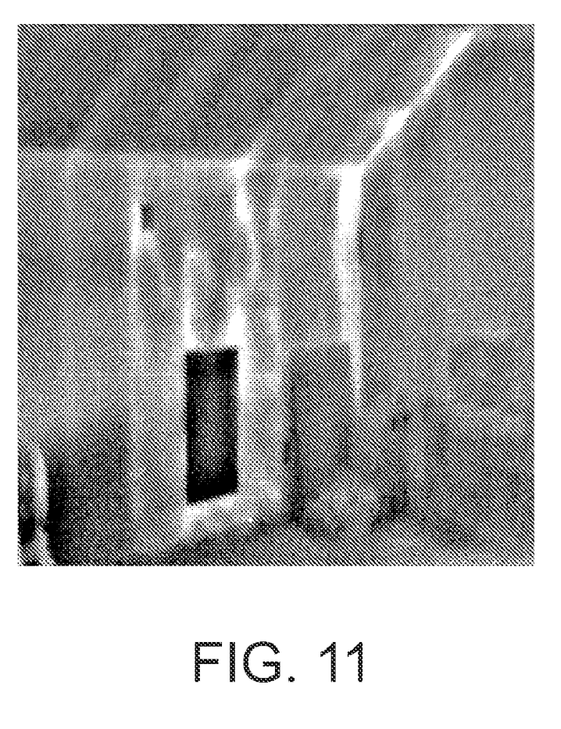
FIG. 11 is a thermal image of a residential building component.

An air advice monitor (Serial No. 13416) was placed in a residential building for four days. The data obtained showed a high level of particulate as shown in FIG. 10. A temperature differential of greater than 100° F. between the interior and exterior was obtained. A thermal scan of the residential building components did not show rodent infestation. The random particulate pattern was identified as a house cat. If the random particulate was not generated by a pet, the thermal scan of the residential building components could show mice infestation as evidenced by tunnels as in FIG. 11. In this situation, the inspector can advise the homeowner that the level of particle in the air can be reduced by eliminating the mice infestation.

Although the present invention has been described and illustrated with respect to preferred embodiments and a preferred use thereof, it is not to be so limited since modifications and changes can be made therein which are within the full scope of the invention.

The invention claimed is:

1. A method to provide a report identifying factors effecting indoor environmental air quality for a residence comprising:
   recording indoor air quality data for at least 24 hours;
   creating a temperature differential of greater than 10° F. between the interior and the exterior of the residence;
   obtaining at least one temperature profile of at least one interior building component of said residence;
   wherein said indoor air quality data is compared to a thermal anomaly to identify factors affecting indoor environmental quality; and
   providing a report identifying factors effecting indoor environmental air quality for the residence.

2. The method of claim 1 wherein data on indoor air quality data is obtained using:
   an indoor air quality monitoring station.

3. The method of claim 2 wherein the indoor air quality monitoring station detects volatile organic compounds.

4. The method of claim 2 wherein the indoor air quality monitoring station detects carbon dioxide.

5. The method of claim 2 wherein the indoor air quality monitoring station detects relative humidity.

6. The method of claim 2 wherein the indoor air quality monitoring station detects carbon monoxide.

7. The method of claim 2 wherein the indoor air quality monitoring station detects particulate matter.

8. The method of claim 7 further comprising the step of obtaining air mold sample.

9. The method of claim 7 further comprising the step of obtaining swab mold sample.

10. The method of claim 1 further comprising recording sound pressure data for at least 24 hours.

11. The method of claim 1 further comprising recording the temperature of said residence for 24 hours.

12. The method of claim 5 further comprising: obtaining acoustic data on termite activity and comparing said acoustic data with indoor air quality data on relative humidity.

13. A method to identify factors affecting indoor air quality of a residential building having an interior and an exterior, comprising the steps of:
   creating a temperature differential of greater than 10° F. between the interior and the exterior of the residential building;
   obtaining at least one temperature profile of at least one interior building component;
   assessing said at least one temperature profile for a thermal anomaly;
   obtaining data on indoor air quality; and
   comparing the data on indoor air quality with at least one temperature profile for an anomaly to identify a factor effecting indoor air quality.

14. The method of claim 13 further comprising obtaining data on indoor air quality for at least 24 hours.

15. The method of claim 13 wherein data on indoor air quality is obtained using:
   an indoor air quality monitoring station.

16. The method of claim 13 wherein the indoor air quality monitoring station detects volatile organic compounds.

17. The method of claim 15 wherein the indoor air quality monitoring station detects carbon dioxide.

18. The method of claim 15 wherein the indoor air quality monitoring station detects relative humidity.

19. The method of claim 15 wherein the indoor air quality monitoring station detects carbon monoxide.

20. The method of claim 15 wherein the indoor air quality monitoring station detects particulate matter.

21. The method of claim 20 further comprising the step of obtaining air mold sample.

22. The method of claim 20 further comprising the step of obtaining swab mold sample.

* * * * *